UNITED STATES PATENT OFFICE.

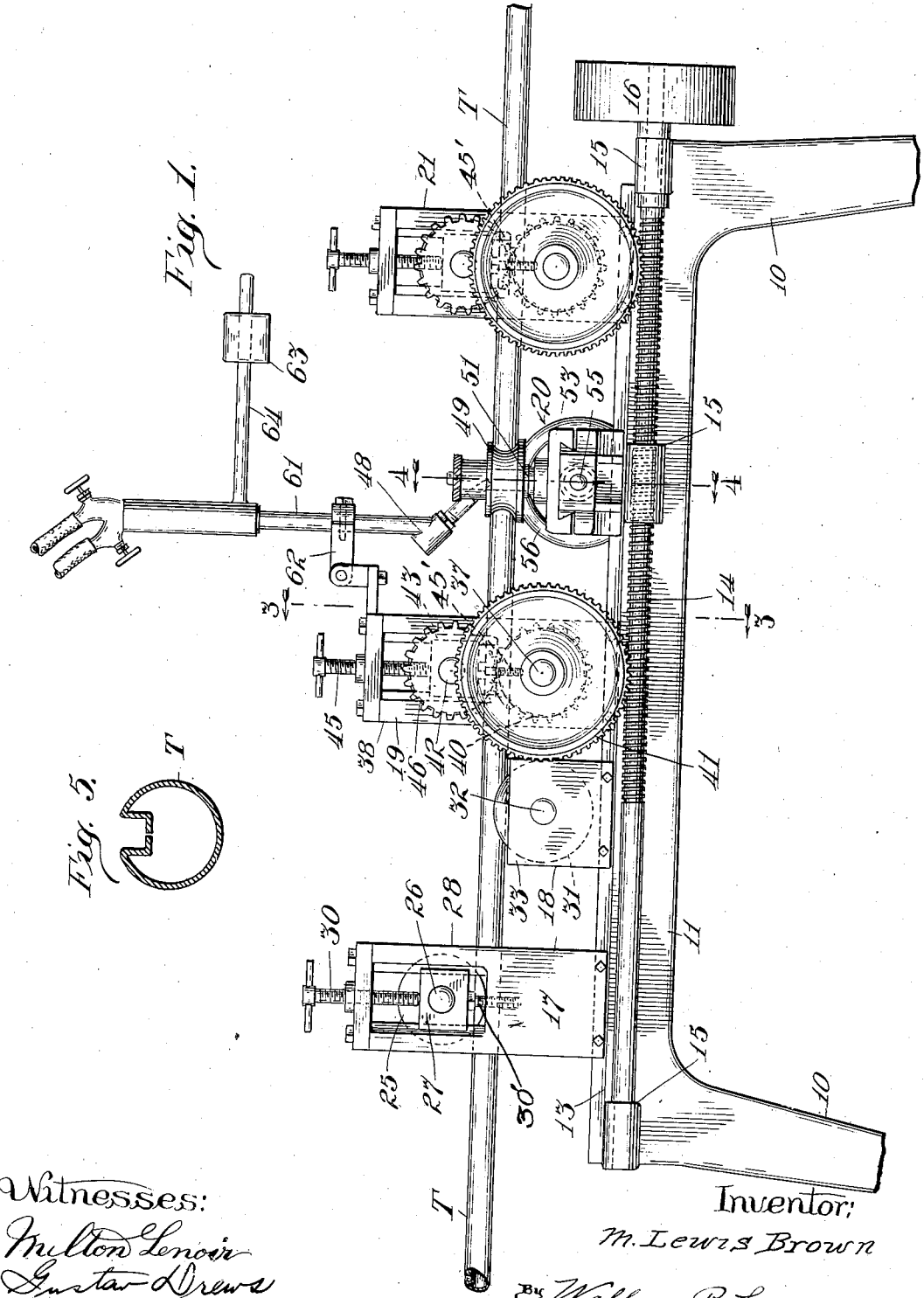

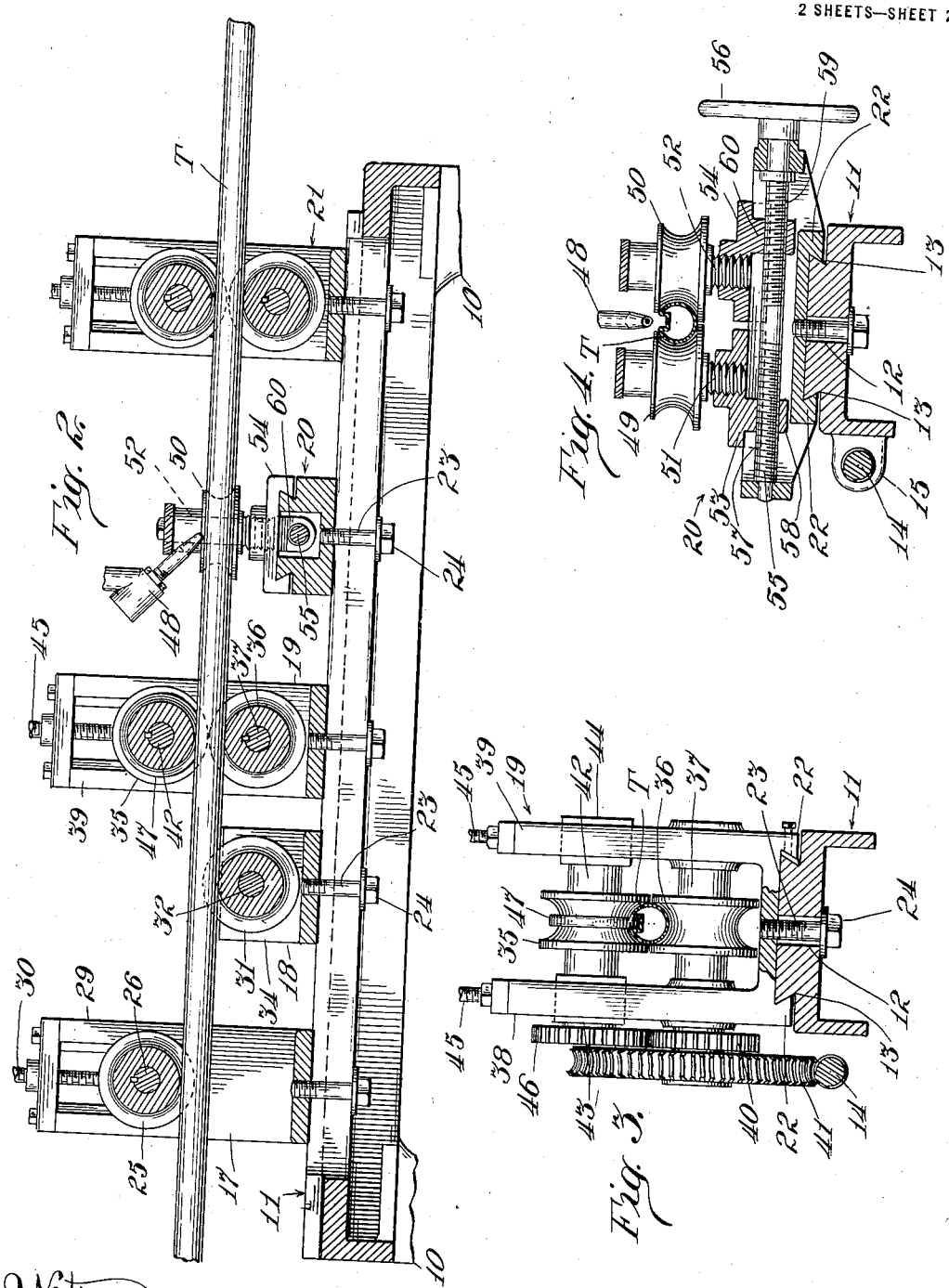

M. LEWIS BROWN, OF NILES, MICHIGAN, ASSIGNOR TO KAWNEER MANUFACTURING COMPANY, OF NILES, MICHIGAN.

TUBE-MAKING MACHINE.

1,200,304.  Specification of Letters Patent.  Patented Oct. 3, 1916.

Application filed April 5, 1913. Serial No. 759,131.

*To all whom it may concern:*

Be it known that I, M. LEWIS BROWN, a citizen of the United States, residing at Niles, in the county of Berrien and State of Michigan, have invented certain new and useful Improvements in Tube-Making Machines, of which the following is a specification.

It is the object of the present invention to provide a machine for constructing seamless tubing and more particularly it is the object of the machine to weld and straighten tubing shaped up from a flat blank and having a channel or groove at the bottom of which the weld is to be made. The product turned out by this machine is especially well suited for use in constructing frames for holding plate glass. A practically straight channel free from any irregularities is necessary in order to hold glass and the like.

It is a further object of this invention to produce a tube that will fill such requirements.

The capabilities and advantages of the present invention will be more fully understood from a detail description of the drawings in which—

Figure 1 is a side elevation of an embodiment of the invention. Fig. 2 is a vertical longitudinal section of the device of Fig. 1. Fig. 3 is a cross-sectional view taken along the line 3—3 of Fig. 1 showing the straightening rolls in detail. Fig. 4 is a cross-sectional view taken along the line 4—4 of Fig. 1 showing in detail the rolls for holding the two ends of the abutting edges of the tube together while they are operated upon by the welding torch, and Fig. 5 is a cross-sectional view of the tube.

As shown in the drawings, the machine consists of a bed 11 mounted on legs 10, 10, the bed having a longitudinal opening 12 along the middle thereof. Longitudinal recesses 13, 13 are provided on each side of the upper face of the bed 11 running the entire length thereof, see Figs. 3 and 4. Along one side of the bed, a screw-threaded shaft 14 is journaled in bearings 15, 15 and driven by means of pulley 16 mounted on the end of said shaft.

A tube T to be operated upon is passed between a series of rolls which are journaled in suitable housings slidably mounted on said bed 11. In the present instance, there are five such housings or carriages 17, 18, 19, 20 and 21. These housings as shown in Figs. 3 and 4 have projections or runners 22, 22 on their lower side which ride in the recesses 13, 13. Each housing is provided with a screw 23 having a head 24 which screw passes through the longitudinal opening 12 and into the housing, the bed 11 being located between the housing and the head 24. By this means the housings are locked in place on the bed 11.

In the actual operation of the machine, a tube T first is operated upon by the idler 25 in the housing 17 which engages the upper side of the tube. This idler is mounted on shaft 26 journaled in slide blocks 27, 27 slidable one in each of the uprights 28, and 29. These slide blocks 27 are vertically adjustable by means of screws 30, 30' and thereby the idler 25 can be vertically adjusted. The periphery of this idler 25 is concave to properly engage the tube. Next the tube T is engaged by the idler 31 mounted in housing 18 which engages the lower side of the tube. This second idler is mounted on shaft 32 journaled between the two uprights 33, 34 of the housing 18. This idler also has a concave periphery similar to idler 25. The tube is then engaged by the first pair of straightening rolls 35, 36 which are mounted in the housing 19. This pair of straightening rolls is identical with the second pair of straightening rolls mounted in housing 21 and therefore it will suffice to describe but one pair.

The roll 36 is mounted on shaft 37 which is journaled in the uprights 38, 39 best shown in Fig. 3. On the end of shaft 37 and fast thereon are mounted a small transmission pinion 40 and a large driving pinion 41. The large driving pinion 41 is actuated by the screw-threaded shaft 14. Roll 35 is mounted on shaft 42 journaled in sliding blocks 43, 44, slide block 43 sliding in upright 38 and slide block 44 in upright 39. These are vertically adjustable by adjusting screws 45, 45 45', 45' and thereby the rolls 35 can be vertically adjusted. On the outer end of shaft 42 is a pinion 46 in mesh with pinion 40. Thus it will be seen that shaft 14 actuating pinion 41, and pinion 41 carrying pinion 40 with it, which is in mesh with pinion 46, the rolls 35 and 36 will rotate in opposite directions.

The tube T that is used in the present machine as already stated has a channel bent into it longitudinally thereof, a cross section of which is shown in Fig. 5. The roll 36 has a concave periphery to properly receive the lower side of the tube T, and roll 35 which engages the upper side of the tube also has a concave periphery but in addition thereto, has a bead 47 running along the middle of its periphery. Thus roll 35 by means of the concave portion of its periphery engages the outer part of the upper side of the tube and by means of the bead 47 which is made of the desired thickness engages and runs in the channel of the tube. By this means the tube with its channel will be securely held in proper shape when passed to the welding torch 48 for welding.

To firmly hold the tube in place while the welding operation is being performed, a pair of idlers 49 and 50 are provided rotatably mounted on vertical shafts 51 and 52, respectively, on the housing 20. These idlers 51 and 52 are mounted on carriages 53 and 54 respectively and are provided with concave peripheries which peripheries are provided with upper and lower flanges, the upper being shorter or of less diameter than the lower to allow the welding torch to operate between said idlers. A screw-threaded shaft 55 operated by a hand wheel 56 is in engagement with carriages 53 and 54. The screw-threaded engagement 57 of shaft 55 traveling in the internally screw-threaded collar 58 of carriage 53 operates in the opposite direction to the screw-threaded engagement 59 of shaft 55 traveling in the internally screw-threaded collar 60 of this shaft. Thus when hand wheel 56 is turned, it will operate either to move idlers 49 and 50 toward one another or from one another, thereby assuring a firm adjustment and preventing displacement or chattering of the tube while the same is operated upon by the torch 48.

The welding torch 48 is of the usual construction directed at an inclination to the tube T and suspended from a supply pipe 61 which is held in place by an arm 62 secured to the housing 19. A weight 63 is carried by an arm 64 secured to the tube 61, this operating to hold down the torch while in operation. After the tube T has passed the welding torch 48, it is engaged by a second pair of straightening rolls in the housing 21, which as already stated, are identical with those in housing 19. By arranging the straightening rolls before and immediately after the welding operation, the tube is kept perfectly straight. Obviously, when straightening rolls are applied to the tube immediately after it has passed the welding torch, the tube being still warm, no special pressure is required to return it to its already straightened form.

While there is herein shown and described only one embodiment of the invention, it is to be understood that various changes and modifications may be made by those skilled in the art without departing from the scope of the invention as defined in the appended claims.

Having thus described my invention, what I claim as new and desire to secure by Letters Patent is:

1. In a machine of the character described, the combination of a support having positioned thereon means for guiding a channeled tube to be operated upon a pair of straightening rolls consisting of a lower roll having a concave periphery for engaging the lower rounded side of said tube and an upper roll having a concave periphery and a bead running in the middle of said concave periphery for engaging the upper and channeled side of said tube, rolls for holding said tube in position to be welded, and a second pair of straightening rolls positioned immediately thereafter to engage the tube and straighten it as soon as it has passed from said welding operation.

2. In a machine for welding the longitudinal edges of channeled tubes which are formed from a strip of metal, a support having located thereon means for initially guiding such tube, two pairs of straightening rolls, and a pair of guide rolls for holding said tube while its longitudinal edges are being welded together, said guide rolls consisting of two rolls rotating on vertical shafts, each roll having a concave periphery which engages one side of the tube, the upper flange of said concave peripheries being shorter than the lower flange in order to allow a free space for the welding torch to operate between such rolls.

3. In a machine for welding tubes which are formed from a strip of metal, a support having located thereon two pairs of straightening rolls, and a pair of guide rolls for holding said tube while its longitudinal edges are being welded together, said guide rolls consisting of two rolls rotating on vertical shafts, each roll having a concave periphery which engages one side of the tube, the upper flange of said concave peripheries being shorter than the lower flange in order to allow a free space for the welding torch to operate between such rolls.

4. In a machine for welding tubes which are formed from a strip of metal, a support having located thereon means for initially guiding such tube, two pairs of straightening rolls, and a pair of guide rolls for holding said tube while its longitudinal edges are being welded together, an arm secured to said support, and a welding torch mounted on said arm and positioned to operate on said tube with its point of operation between said pair of guide rolls.

5. In a machine for welding the longitudinal edges of channeled tubes which are formed from a strip of metal, a support having located thereon means for initially guiding such tube, two pairs of straightening rolls, and a pair of guide rolls for holding said tube while its longitudinal edges are being welded together, said guide rolls consisting of two rolls rotating on vertical shafts, each roll having a concave periphery which engages one side of the tube, an arm secured to said support, and a welding torch mounted on said arm positioned to operate on said tube while it is between said guide rolls, the upper flange of the concave peripheries of said guide rolls being shorter than the lower flange in order to allow the welding torch to operate between said rolls.

6. A machine for welding channeled tubes which are formed from a strip of metal, and in combination, welding mechanism, a support having mounted thereon two pairs of straightening rolls longitudinally adjustable along said support, said straightening rolls consisting of a lower roll having a concave periphery for engaging the lower rounded side of the tube being operated upon, and an upper roll also having a concave periphery and a bead running along the middle thereof for engaging the upper channeled side of said tube.

7. A machine for welding channeled tubes which are formed from a strip of metal, said machine consisting of a support having mounted thereon means for initially guiding such tube, said guiding means being longitudinally adjustable along said support, two pairs of straightening rolls longitudinally adjustable along said support, and a pair of guide rolls longitudinally adjustable along said support for holding said tube while its longitudinal edges are being welded together, said guide rolls consisting of two rolls rotating on vertical shafts, each roll having a concave periphery which engages one side of the tube, the upper flange of said concave peripheries being shorter than the lower flange in order to allow a free space for the welding torch to operate between such rolls.

8. In a machine for welding tubes, the combination of a support having mounted thereon guiding means and straightening means arranged to prevent the buckling of the tube in a vertical plane, said guiding means and straightening means being longitudinally adjustable along said support, a welding torch, and an arm mounted upon said support for holding said welding torch.

9. A machine for welding channeled tubes which are formed from a strip of metal, a support, a welding device, two pairs of straightening rolls longitudinally adjustable along said support and arranged in front of and behind said welding device, said straightening rolls consisting of a lower roll having a concave periphery for engaging the lower rounded side of the tube being operated upon, and an upper roll also having a concave periphery and a bead running along the middle thereof for engaging the upper channeled side of said tube, and a screw-threaded driving shaft positioned along the side of said support to drive said straightening rolls.

10. In apparatus of the class described, a plurality of adjustable supports, a set of straightening rolls mounted on said supports for straightening a curved tube, one roll of each of said sets of rolls being provided with a bead to fit the channel in the tube to prevent the same from turning, a pair of rolls located between adjoining pairs of straightening rolls to bring the edges of the tube together for welding, the upper flanges of said last named rolls being cut away to permit the tube to be welded therebetween and a welding torch adapted to direct its flame between said cut away flanges, for the purpose described.

In witness whereof, I hereunto subscribe my name to this specification in the presence of two witnesses.

M. LEWIS BROWN.

Witnesses:
J. LOUIS RULO,
A. W. SORTORE.

Copies of this patent may be obtained for five cents each, by addressing the "Commissioner of Patents, Washington, D. C."